US011088988B2

(12) United States Patent
Chuu

(10) Patent No.: US 11,088,988 B2
(45) Date of Patent: Aug. 10, 2021

(54) VIRTUAL-MACHINE DATAPLANE WITH DHCP-SERVER FUNCTIONALITY

(71) Applicant: ARRIS Enterprises LLC, Suwanee, GA (US)

(72) Inventor: Wayne Chuu, Saratoga, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 39 days.

(21) Appl. No.: 16/329,753

(22) PCT Filed: Aug. 30, 2016

(86) PCT No.: PCT/US2016/049520
§ 371 (c)(1),
(2) Date: Feb. 28, 2019

(87) PCT Pub. No.: WO2018/044281
PCT Pub. Date: Mar. 8, 2018

(65) Prior Publication Data
US 2019/0238501 A1     Aug. 1, 2019

(51) Int. Cl.
*H04L 29/12* (2006.01)
*H04L 12/46* (2006.01)
(Continued)

(52) U.S. Cl.
CPC ...... *H04L 61/2015* (2013.01); *H04L 12/4641* (2013.01); *H04L 47/2483* (2013.01);
(Continued)

(58) Field of Classification Search
CPC ............. H04L 61/2015; H04L 61/6022; H04L 61/256; H04L 12/4641; H04L 69/22; H04L 49/3063
See application file for complete search history.

(56) References Cited

U.S. PATENT DOCUMENTS 8,037,180 B2 * 10/2011 Smith ................. H04L 67/1002
709/225
10,278,226 B2    4/2019 Bhatnagar et al.
(Continued)

FOREIGN PATENT DOCUMENTS

WO    WO 2014-142723       9/2014

OTHER PUBLICATIONS

Ruckus Virtual Data Plane to Help Operators Separate Traffic, Digital News Asia, Nov. 16, 2015.
(Continued)

*Primary Examiner* — Jamal Javaid
(74) *Attorney, Agent, or Firm* — Steven Stupp; Stewart Wiener

(57) ABSTRACT

In order to provide efficient processing of Dynamic Host Control Protocol (DHCP) data flows and dynamic Internet Protocol (IP) address management, an electronic device that implements a virtual dataplane in a network may separate the DHCP data flows from other data flows. Then, the virtual dataplane may perform IP address management using one or more applications that are executed by a processor in the electronic device. In order to accelerate processing of a sequence of packets in a DHCP data flow to a destination, the virtual dataplane may look up a stored result of a look-up operation for a first packet in the sequence, so that subsequent packets in the sequence use the stored result without performing the look-up operation. Furthermore, the IP address management may include dynamically freeing up IP addresses in the network based on network activity of client devices.

20 Claims, 11 Drawing Sheets

(51) Int. Cl.
  *H04L 12/851* (2013.01)
  *H04L 12/935* (2013.01)
  *H04L 29/06* (2006.01)

(52) U.S. Cl.
  CPC ........ *H04L 49/3063* (2013.01); *H04L 61/256* (2013.01); *H04L 61/6022* (2013.01); *H04L 69/22* (2013.01); *H04L 61/103* (2013.01)

(56) References Cited

U.S. PATENT DOCUMENTS

| | | | |
|---|---|---|---|
| 2002/0141339 A1 | 10/2002 | Konuma | 370/229 |
| 2008/0148341 A1 | 6/2008 | Ferguson | 726/1 |
| 2009/0240874 A1* | 9/2009 | Pong | G06F 12/0223 711/105 |
| 2012/0304175 A1 | 11/2012 | Damola | 718/1 |
| 2013/0247034 A1 | 9/2013 | Messerli | 718/1 |
| 2014/0079170 A1 | 3/2014 | Le Houerou | H04L 7/0016 |
| 2014/0181818 A1 | 6/2014 | Vincent et al. | 718/1 |
| 2014/0233571 A1 | 8/2014 | Pope et al. | 370/392 |
| 2014/0269319 A1 | 9/2014 | DeCusatis | H04L 47/12 |
| 2014/0355977 A1 | 12/2014 | Bjornstad | H04L 49/3036 |
| 2014/0362807 A1* | 12/2014 | Bhatnagar | H04W 4/00 370/329 |
| 2015/0016266 A1 | 1/2015 | Dumitrescu | H04L 47/527 |
| 2015/0074246 A1 | 3/2015 | Premji | H04L 41/0803 |
| 2015/0163196 A1* | 6/2015 | Bhagwat | H04L 61/2061 709/245 |
| 2015/0188780 A1 | 7/2015 | Spieser | H04L 41/5009 |
| 2016/0182336 A1 | 1/2016 | Doctor | H04L 43/0894 |

OTHER PUBLICATIONS

International Search Report and Written Opinion, PCT/US2015/067512, dated Jun. 3, 2016.
Extended European Search Report, European Patent Application No. 15901871.2, dated Mar. 15, 2019.
Extended European Search Report, European Patent Application No. 16915362.4, dated Jan. 24, 2020.
European Patent Appl. No. 16915362.4, Extended European Search Report, dated Jan. 24, 2020.
Canadian Patent Appl. No. 3,064,945, Office Action, dated Feb. 26, 2020.

* cited by examiner

VIRTUAL-MACHINE DATAPLANE WITH DHCP-SERVER FUNCTIONALITY

BACKGROUND

Field

The described embodiments relate to techniques for communicating information among electronic devices, including providing and managing Internet Protocol (IP) addresses using a dataplane with virtual machines that implement Dynamic Host Control Protocol (DHCP)-server functionality.

Related Art

Many service providers and facilities owners at public venues, such as sports stadiums and mass transit (e.g., a train station or an airport), offer Internet service via multiple access points. However, users at these venues often have trouble accessing the Internet.

The problem in these deployments is that many existing DHCP servers are slow. In particular, while high-performance DHCP servers exist, these typically involve a dedicated hardware appliance, which is often expensive and can take up valuable space. Alternatively, a DHCP servers based on a Linux socket/kernel may take more time to process IP management traffic because it services other applications, interrupts, etc. Because a large number of users may ask to join the network in a relatively short time interval in a congested public area or venue, the poor performance of a DHCP server can be a bottleneck that degrades the overall performance of the network, thereby jeopardizing the investment by the service providers and facilities owners in a high-performance network and frustrating users.

SUMMARY

The described embodiments relate to an electronic device that implements a virtual dataplane having one or more virtual machines. This electronic device includes: an interface circuit that, during operation, communicates with one or more access points; a processor; and a memory that stores a program module, which is executed by the processor, with instructions for a pipeline in the virtual dataplane. During operation, a first stage in the pipeline parses packets to identify packets associated with data flows, where the identification is based on types of packets including packets associated with a Dynamic Host Control Protocol (DHCP) data flow. Then, a first path in the pipeline processes the packets associated with the DHCP data flow that are consumed (i.e., destined for and/or processed in) in the virtual dataplane, where the processing involves Internet Protocol (IP) address management by one or more applications executed by the processor and accessed via the first path, the IP address management involving assigning IP addresses and avoiding (i.e., reducing or preventing) collisions (or conflicts) with existing IP addresses of client devices in a network.

Moreover, a second path in the pipeline may process the packets associated with other data flows that are consumed external to the virtual dataplane, where the processing in the second path occurs with a fixed time delay. Note that the processing of the packets associated with the other data flows in the second path may be faster than the processing of the packets associated with the DHCP data flow in the first path. Furthermore, the processing in the first path and in the second path may occur concurrently.

Alternatively, the packets associated with the other data flows that are identified by the first stage may be subsequently dropped in the virtual dataplane.

Furthermore, the virtual dataplane may process the packets associated with the DHCP data flow without using an operating-system kernel to access a DHCP server.

Additionally, the IP address management may involve dynamically freeing up IP addresses in the network based on network activity of the client devices.

In some embodiments, the IP address management involves: receiving an IP request associated with a client device; determining, based on a media access control (MAC) address of the client device, whether an IP address is already assigned to the client device or whether the assigned IP address has exceeded a lease time; if not, assigning a new IP address to the client device; and avoiding collisions in the network by reassigning a different IP address to another client device in the network.

Moreover, determining whether the IP address is already assigned to the client device or whether the assigned IP address has exceeded the lease time may involve a look-up operation using a hash table.

Furthermore, processing of a sequence of packets associated with the DHCP data flow to a particular destination may be accelerated by storing a result of the look-up operation performed for a first packet in the sequence, so that subsequent packets in the sequence use the stored result without performing the look-up operation.

Additionally, the one or more applications may perform Network Address Translation (NAT).

Note that the pipeline may be executed by one or more cores in the processor.

Another embodiment provides a computer-program product for use with the electronic device. This computer-program product includes instructions for at least some of the operations performed by the virtual dataplane.

Another embodiment provides a method. This method includes at least some of the operations performed by the virtual dataplane.

This Summary is provided for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
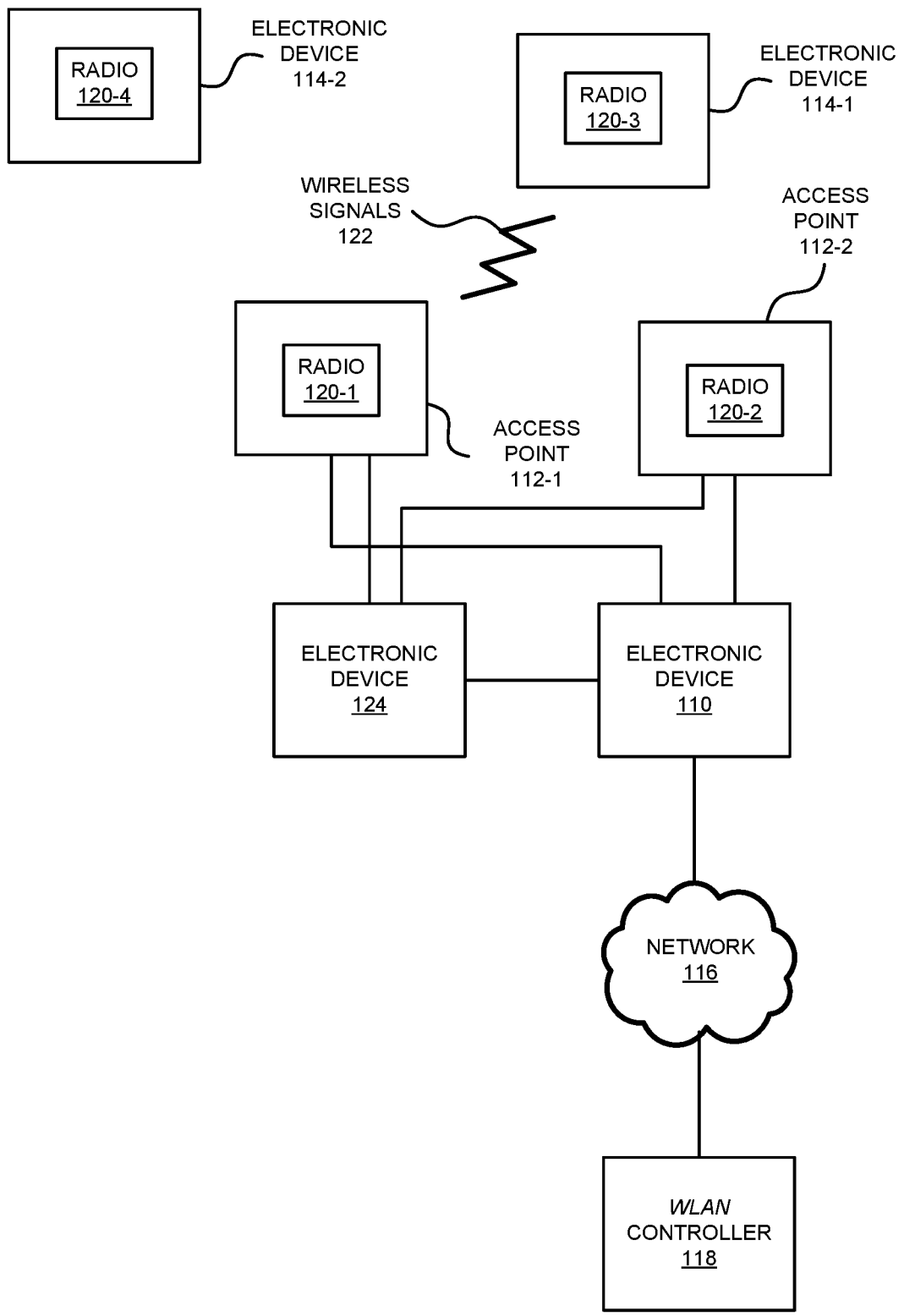
FIG. 1 is a block diagram illustrating electronic devices wirelessly communicating in accordance with an embodiment of the present disclosure.

Table 1 presents profiles in a dhcpd.conf file in accordance with an embodiment of the present disclosure.

Table 2 presents an example of an Internet Protocol (IP) hash table in accordance with an embodiment of the present disclosure.

Table 3 presents an example of a media access control (MAC) hash table in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

In order to provide efficient processing of DHCP data flows and dynamic IP address management, an electronic device that implements a virtual dataplane in a network may efficiently process packets associated with the DHCP data flows without using an operating-system kernel to access a DHCP server. During the processing, the virtual dataplane may separate the DHCP data flows from other data flows. Then, the virtual dataplane may perform IP address management using one or more applications that are executed by a processor in the electronic device. In order to accelerate processing of a sequence of packets in a DHCP data flow to a destination, the virtual dataplane may store a result of a look-up operation using a hash table. This stored result may be looked up or accessed for a first packet in the sequence, so that subsequent packets in the sequence use the stored result without performing the look-up operation. Furthermore, the IP address management may include dynamically freeing up IP addresses in the network based on network activity of client devices.

Because the packets associated with the DHCP data flows can be processed without using an operating-system kernel to access a DHCP server, the virtual dataplane may reduce or eliminate bottlenecks associated with DHCP servers in networks. Consequently, the electronic device may improve the communication performance of the networks and may reduce user frustration. Moreover, by facilitating dynamic freeing up of IP addresses in a network based on network activity of client devices, the electronic device may provide improved electronic-device-centric management of IP addresses. This capability may improve IP address assignments, thereby reducing or eliminating wasted IP addresses, and thus reducing the cost and the complexity of IP address management, especially in small-area deployments.

In the discussion that follows, the electronic device may include a radio or an interface circuit that communicates packets in accordance with a communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi and Ethernet are used as illustrative examples. However, a wide variety of communication protocols may be used.

Communication among electronic devices is shown in FIG. 1, which presents a block diagram illustrating an electronic device 110 that implements a virtual dataplane, access points 112 and client devices 114 (such as computers, portable electronic devices, e.g., cellular telephones, etc.) communicating according to some embodiments. Access points 112 may provide wirelessly communication with one or more electronic devices (such electronic device 110 and/or client devices 114), and may provide access to network 116 via electronic device 110 using IEEE 802.3 (which is sometimes referred to as 'Ethernet'). In particular, access points 112 and client devices 114 may wirelessly communicate while: transmitting advertising frames on wireless channels, detecting one another by scanning wireless channels, establishing connections (for example, by transmitting association requests), and/or transmitting and receiving packets (which may include the association requests and/or additional information as payloads). Moreover, electronic device 110 and access points 112 may communicate, which, in general, may involve wired and/or wireless communication. Furthermore, access points 112 may communicate with a wireless local area network (WLAN) controller 118 (which is sometimes referred to as a 'controller' or a 'WLC') via electronic device 110 and network 116. In some embodiments, WLAN controller 118 is a virtual controller.

Figure 11:
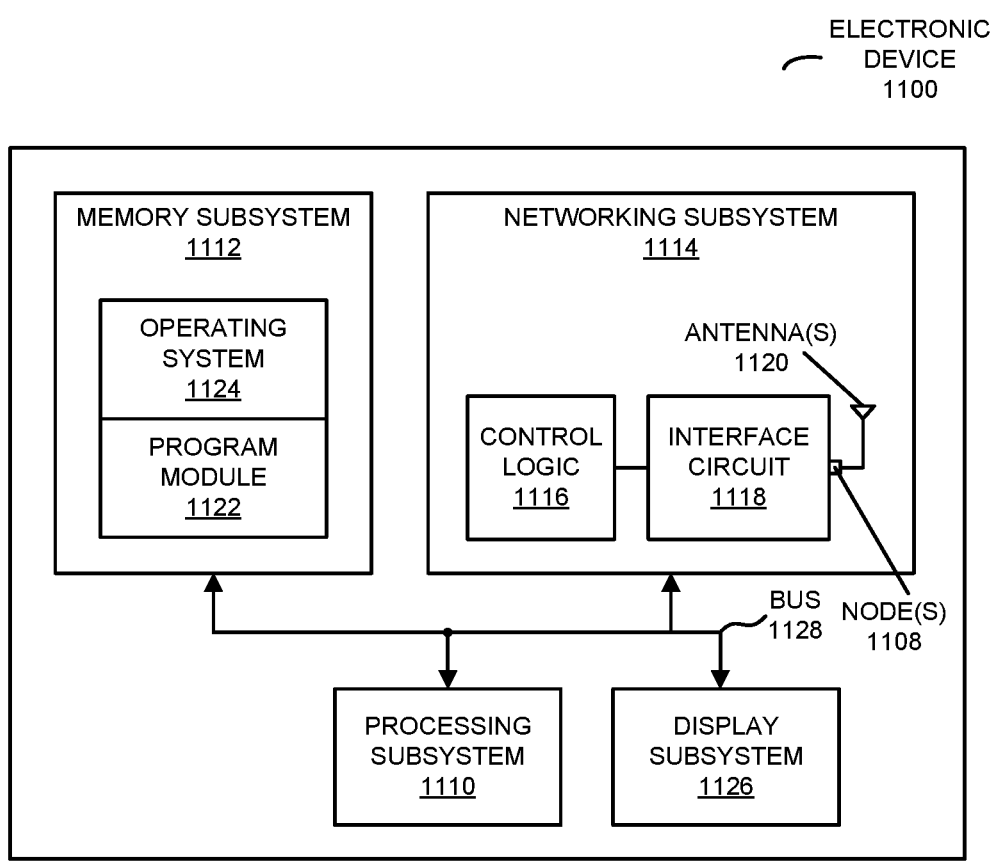
FIG. 11 is a block diagram illustrating an electronic device in accordance with an embodiment of the present disclosure.

As described further below with reference to FIG. 11, electronic device 110, access points 112 and client devices 114 may include subsystems, such as a networking subsystem, a memory subsystem and a processor subsystem. In addition, access points 112 and/or client devices 114 (and optionally electronic devices 110 or 124) may include radios 120 in the networking subsystems. More generally, electronic device 110, access points 112 and/or client devices 114 can include (or can be included within) any electronic devices with the networking subsystems that enable access points 112 and client devices 114 to communicate with each other, including wired and wireless communication. The wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 116 are shown in access points 112 and client devices 114, one or more of these instances may be different from the other instances of radios 120.

As can be seen in FIG. 1, wireless signals 122 (represented by jagged lines) are transmitted from radio 120-2 in access point 112-1. These wireless signals 122 may be received by radios 120 in one or more of electronic device 110 and/or client devices 114 (such as client device 114-1).

In particular, access point 112-1 may transmit packets. In turn, these packets may be received by the one or more of electronic device 110 and/or client devices 114. Moreover, as described further below, electronic device 110 may configure and/or allow client devices 114 to communicate with other electronic devices, computers and/or servers via network 118.

Note that the communication between electronic device 110, access points 112 and/or client devices 114 may be characterized by a variety of performance metrics, such as: a received signal strength (RSS), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments, processing a packet or frame in electronic device 110, access points 112 and/or client devices 114 includes: receiving wireless signals 122 with the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

In addition to the congestion discussed previously, there are often inefficiencies in how IP addresses are managed by DHCP servers. For example, once an IP address is assigned, this IP address is typically only freed up once the lease time expires (which can be many minutes or even hours later). In a public Wi-Fi network, an electronic device of an unintended user may be authenticated and may have an IP addressed assigned to it when it is range of the Wi-Fi network, such as when the user walks through a region with Wi-Fi coverage. Then, if the user walks away and their electronic device is no longer in range of the Wi-Fi network, the IP address is still assigned to the electronic device. Consequently, this IP address is wasted and the pool of IP addresses is unnecessarily drained, which can result in increased expense and network complexity to resolve resulting issues with IP address assignments.

As discussed further below with reference to FIGS. 2-6, in order to address these challenges electronic device 110 may perform at least some of the operations in the communication technique. In particular, electronic device 110 may implement a virtual dataplane that performs at least some DHCP-server functions and/or NAT functions (which may hide IP addresses by presenting a single external IP address and performing a mapping to internal addresses in a network based on a Transmission Control Protocol/User Datagram Protocol port). For example, electronic device 110 may receive IP address requests in data flows from one or more client devices 114 via secure tunnels from one or more access points 112. In response, electronic device 110 may determine, based on one or more MAC addresses of one or more client devices 114, whether IP addresses have already been assigned to the one or more client devices 114 or whether the assigned IP addresses have exceeded their associated lease times. If not, electronic device 110 may assign one or more new IP addresses to one or more of client devices 114. In addition, electronic device 110 may avoid collisions in the network by reassigning different IP addresses to one or more of client devices 114 in the network.

Note that determining whether an IP address is already assigned to one of client devices 114 or whether an assigned IP address has exceeded the lease time may involve electronic device 110 performing a look-up operation using a hash table. Moreover, processing of a sequence of packets associated with a DHCP data flow to a particular destination (such as a web page or a website) may be accelerated in electronic device 110 by storing a result of a look-up operation performed for a first packet in the sequence, so that subsequent packets in the sequence use the stored result without performing the look-up operation.

In some embodiments, an optional electronic device 124 implements a virtual dataplane that includes DHCP relay functionality. Data flows received by electronic device 124 from one or more of access points 112 may be provided to electronic device 110 for IP address management using DHCP exchange.

Note that the virtual dataplane implemented by electronic device 110 may provide 100× faster processing of DHCP flows than some existing DHCP servers. In particular, by bringing the DHCP-server functionality to a lower level in the stack (e.g., by processing packets associated with a DHCP data flow without using an operating-system kernel to access a DHCP server), the virtual dataplane may offer a significant performance improvement. Similarly, the virtual dataplane implemented by electronic device 110 may provide 10× faster NAT processing or performance. In some embodiments, DHCP exchange provided by electronic devices 110 and 124 is 100× faster.

Figure 2:
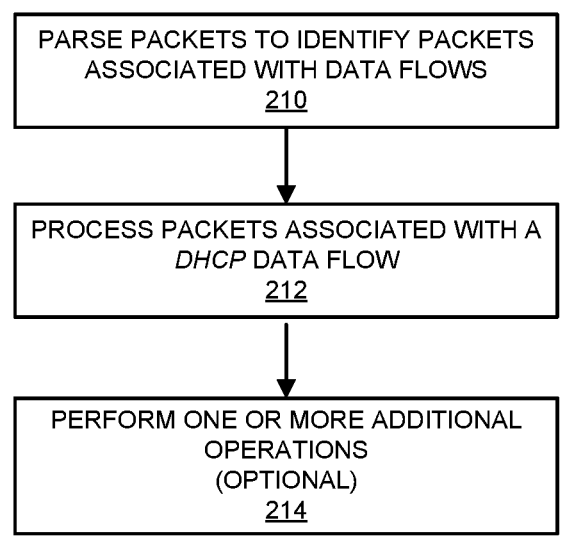
FIG. 2 is a flow diagram illustrating a method for processing packets in a virtual dataplane having one or more virtual machines in accordance with an embodiment of the present disclosure.
Figure 5:
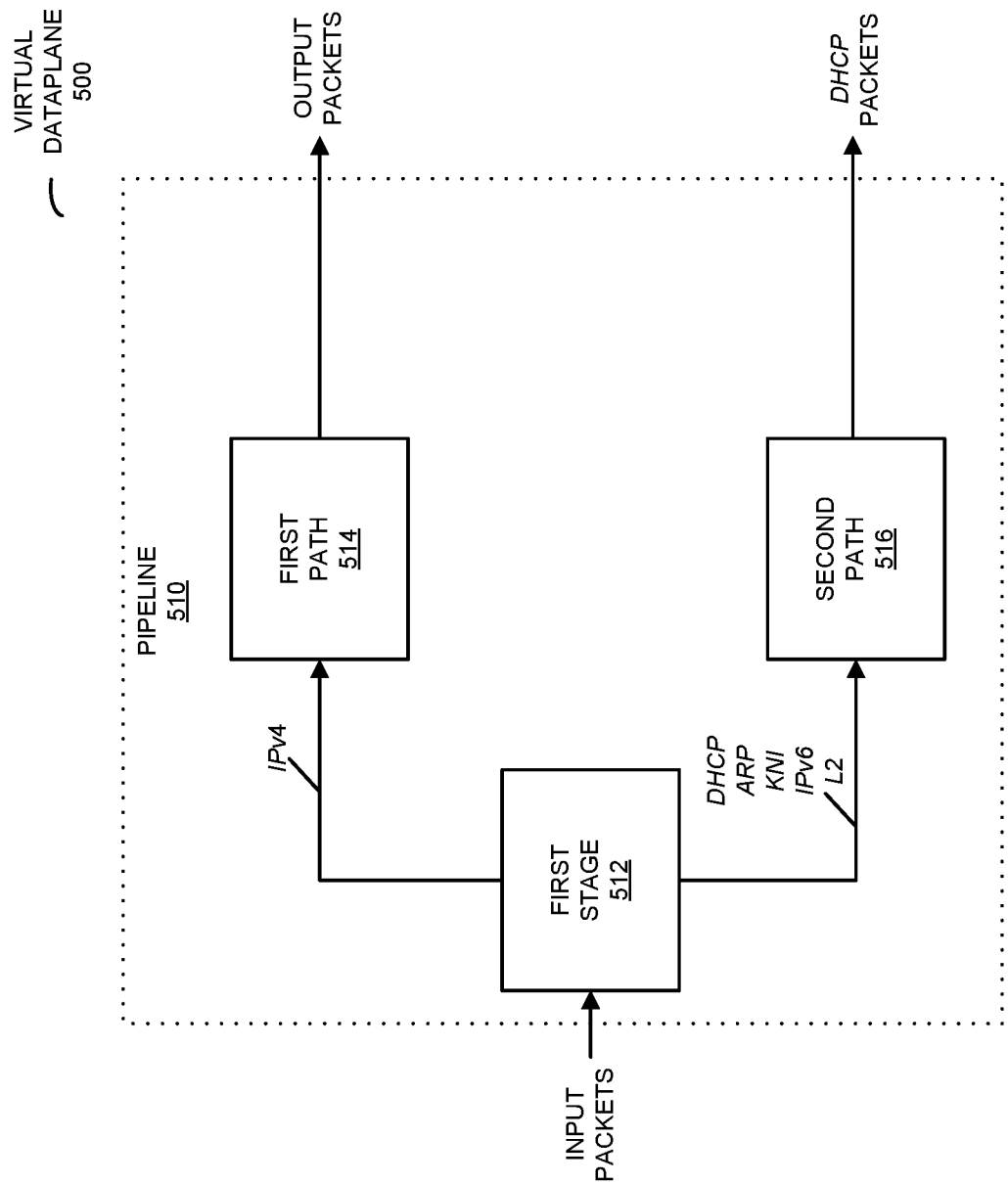
FIG. 5 is drawing illustrating a virtual dataplane in accordance with an embodiment of the present disclosure.

We now describe embodiments of the method. FIG. 2 is a flow diagram illustrating a method 200 for processing packets in an electronic device (such as electronic device 110 in FIG. 1) that implements a virtual dataplane having one or more virtual machines according to some embodiments. As shown in FIG. 5, the virtual dataplane may include a pipeline with a first stage for initial processing of packets, and then first and second paths for subsequent processing of the packets.

During operation, a first stage in a pipeline in the virtual dataplane parses packets (operation 210) to identify packets associated with data flows (such as a DHCP flow that is processed by the pipeline or a set of operations in the virtual dataplane, which is described further below with reference to FIGS. 4 and 5), where the identification is based on types of packets including packets associated with a DHCP data flow. Then, a first path in a pipeline in the virtual dataplane processes packets (operation 212) associated with the DHCP data flow that are consumed in the virtual dataplane, the processing involving IP address management by one or more applications executed by a processor in the electronic device and accessed via the first path. Note that the IP address management may involve assigning IP addresses and avoiding (i.e., reducing or preventing) collisions (or conflicts) with existing IP addresses of client devices in a network.

In some embodiments, the virtual dataplane performs one or more additional optional operations (operation 214). For example, an optional second path in the pipeline may process the packets associated with another data flow that are consumed external to the virtual dataplane, where the processing in the second path occurs with a fixed time delay. Alternatively, the packets associated the other data flow that are identified by the first stage may be subsequently dropped in the virtual dataplane. Furthermore, the IP address management performed by the virtual dataplane may involve dynamically freeing up IP addresses in the network based on network activity of the client devices. Additionally, the one or more applications may perform NAT.

The virtual dataplane may process the packets associated with the DHCP data flow without using an operating-system kernel to access a DHCP server. In addition, the virtual dataplane may use a user-centric or knowledge of network activity to dynamically manage (and, in particular, to dynamically free up) IP addresses in the network.

In some embodiments of method 200, there may be additional or fewer operations. Moreover, the order of the operations may be changed, and/or two or more operations may be combined into a single operation.

Figure 3:
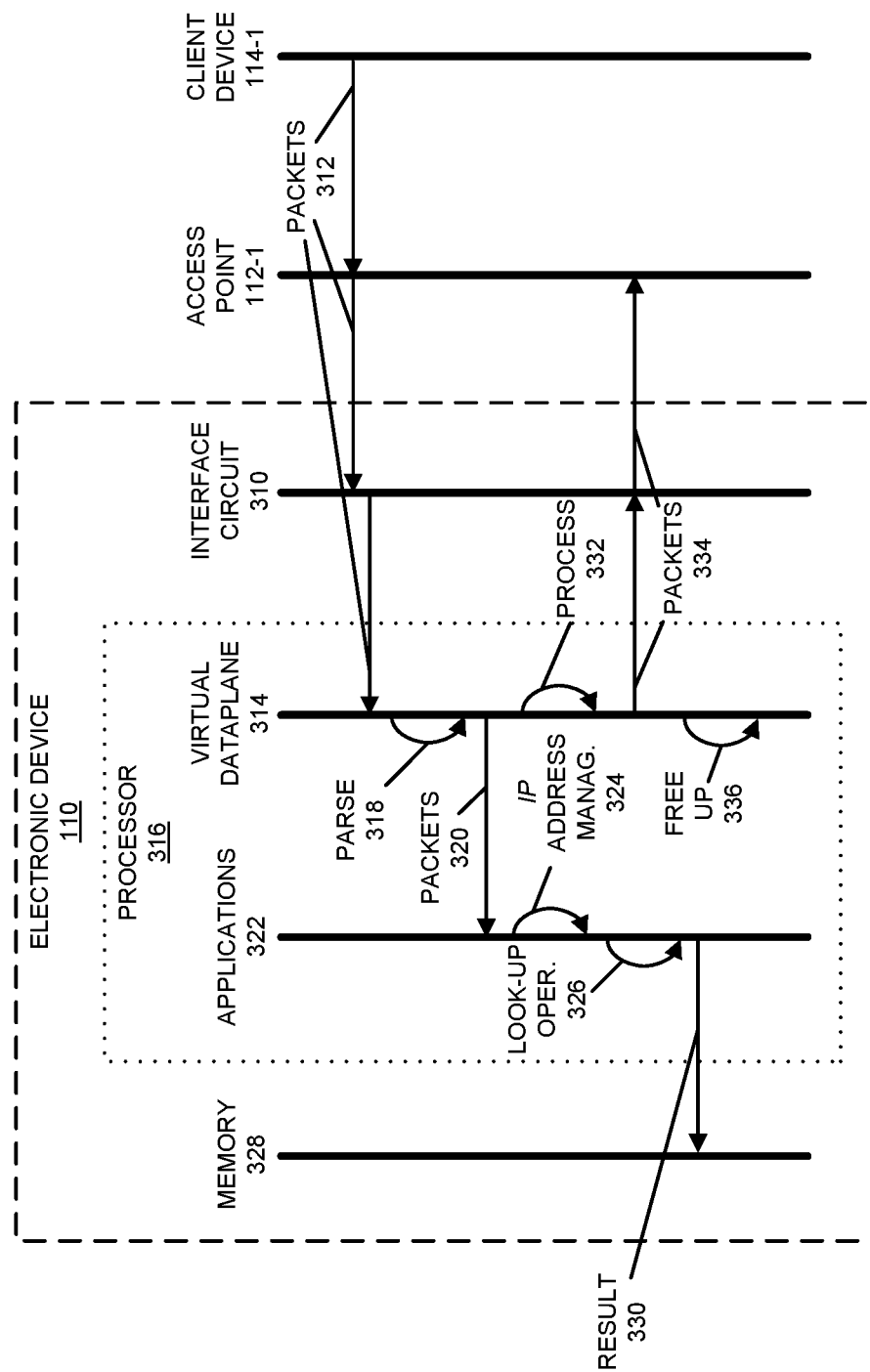
FIG. 3 is a drawing illustrating communication among the electronic device, an access point and a client device in FIG. 1 in accordance with an embodiment of the present disclosure.

Embodiments of the communication technique are further illustrated in FIG. 3, which presents a drawing illustrating communication among electronic device 110, access point 112-1 and client device 114-1 according to some embodiments. In particular, interface circuit 310 (such as a network interface controller port) in electronic device 110 may receive packets 312 in a data flow from client device 114-1 via access point 112-1. Then, a virtual dataplane 314 executing on a processor 316 in electronic device 110 may parse 318 packets 312 to identify packets associated with data flows, where the identification is based on types of packets including packets associated with a DHCP data flow. Next, virtual dataplane 314 may process packets 320 associated with the DHCP data flow that are consumed (i.e., destined for and/or processed in) in virtual dataplane 314, the processing involving IP address management 324 by one or more applications 322 executed by processor 316.

Note that the IP address management may involve assigning IP addresses and avoiding collisions with existing IP addresses of client devices in a network. For example, the IP address management may involve: receiving an IP request associated with client device 114-1; determining, based on a MAC address of client device 114-1 (which may be included in packets 312), whether an IP address is already assigned to client device 114-1 or whether the assigned IP address has exceeded a lease time; if not, assigning a new IP address to client device 114-1; and avoiding collisions in the network by reassigning a different IP address to another client device in the network.

Note that determining whether the IP address is already assigned to client device 114-1 or whether the assigned IP address has exceeded the lease time may involve a look-up operation 326 using a hash table. Moreover, processing of a sequence of packets associated with the DHCP data flow to a particular destination (such as a web page or a website) may be accelerated by storing, in memory 328, a result 330 of look-up operation 326 performed for a first packet in the sequence of packets, so that subsequent packets in the sequence of packets use the stored result 330 without performing look-up operation 326.

In some embodiments, virtual dataplane 314 processes 332 packets 334 that are consumed external to virtual dataplane 314 and then outputs packets 334 using interface circuit 310, where this processing occurs with a fixed time delay. (For example, there may be a fixed number of instructions in processing a packet. This may offer high-performance with predictability, such as a fixed inter-packet time or inter-packet gap, and fixed and minimum-delayed packet latency.) Alternatively, packets 334 that are consumed externally may be subsequently dropped in virtual dataplane 314. Furthermore, the IP address management performed by virtual dataplane 314 may involve dynamically freeing up 336 IP addresses in the network based on network activity of the client devices (such as a user traffic pattern or usage of a client device). Additionally, the one or more applications 322 may perform NAT.

In an exemplary embodiment of the communication technique, the electronic device includes a high-performance dataplane that implements DHCP-server and/or NAT functionality without accessing a separate DHCP server via an operating-system kernel, such as a Linux kernel. Note that the dataplane is generally responsible for moving data around transmit paths, while a control plane is generally responsible for determining and setting up those transmit paths.

The dataplane may be implemented using virtual machines that are executed by multiple cores in one or more processors (such as 3-6 cores in a processor), which allows the dataplane to be flexibly scaled and dynamically reconfigured. These cores may be configured in a one-to-many, a many-to-one and/or a one-to-one architecture in a pipeline in the virtual dataplane. Note that in the discussion that follows, a virtual machine is an operating system or application environment that is implemented using software that imitates or emulates dedicated hardware or particular functionality of the dedicated hardware. Therefore, the dataplane is sometimes referred to as a 'virtual dataplane.'

Figure 4:
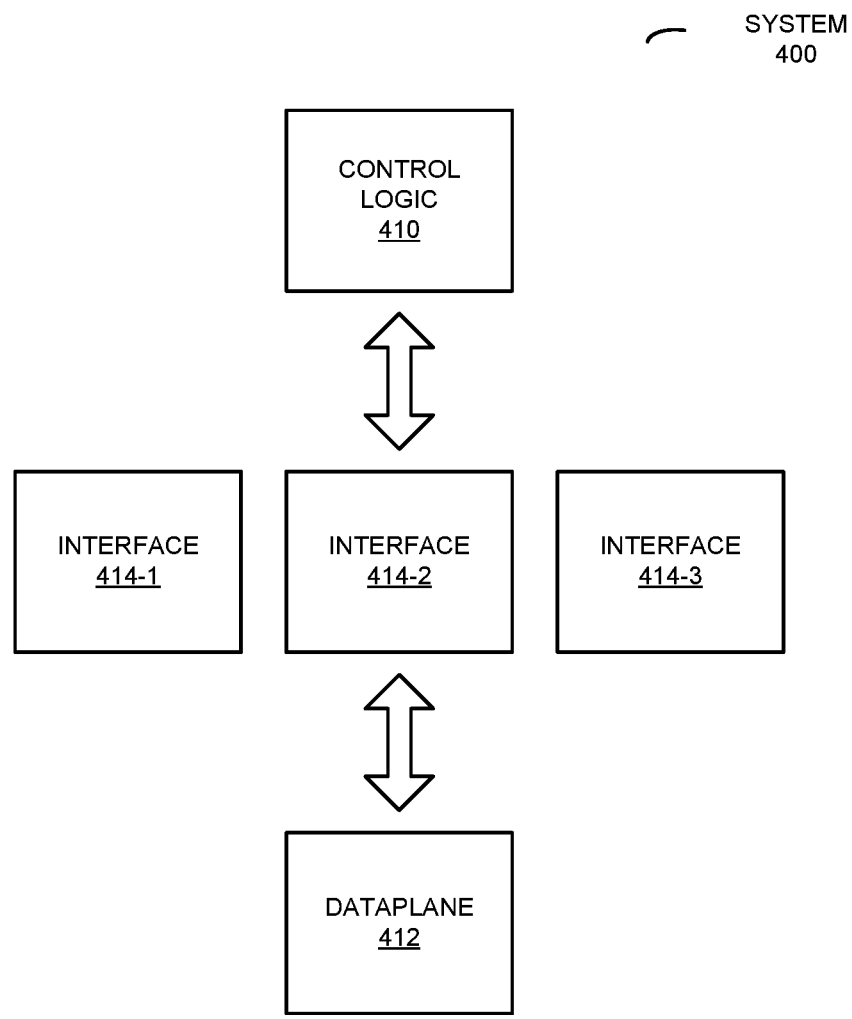
FIG. 4 is drawing illustrating a system in accordance with an embodiment of the present disclosure.

As shown in FIG. 4, which presents a drawing illustrating a system 400 (such as a controller) according to some embodiments. This system may include control logic 410 (such as one or more processors) in a control plane that is used to control traffic or communication with multiple access points. Note that control logic 410 may handle automatic adjustments to the parameters of an access point, such as radio-frequency power, channels, authentication, and security. In addition, system 400 may include a dataplane 412 that processes data that is received from one or more access points via a network (such as the Internet, a wireless network, a cellular-telephone network and/or an intranet). For example, the data may be aggregated into an encryption format before being output onto a network. As shown in FIG. 4, control logic 410 or control plane (which may be implemented using a control blade or c-blade) and dataplane 412 (which may be implemented using a blade or d-blade) may communicate with each other via one or more interfaces 414 (such as a kernel NIC or KNI interface, or a peripheral component interconnect or PCI interface) in system 400. For example, the one or more interfaces 414 may allow dataplane 412 to obtain configuration information and to provide statistical information to control logic 410.

As shown in FIG. 5, which presents a drawing illustrating a virtual dataplane 500 implemented in an electronic device according to some embodiments. Virtual dataplane 500 may include a pipeline 510. A first stage 512 in pipeline 510 may parse packets to identify packets associated with data flows. The identification may be based on types of packets including packets associated with a DHCP data flow. More generally, the type of packets may include: packets associated with a tunnel, encrypted packets, packets having higher priority, etc. Then, a first path 514 in pipeline 510 may process the packets associated with the DHCP data flow that are consumed in virtual dataplane 500 (e.g., the packets in the DHCP data flow may be identified based on identifiers or header information associated with an IP protocol), where the processing involves IP address management by one or more applications executed by a processor in the electronic device and accessed via first path 514, the IP address management involving assigning IP addresses and avoiding collisions with existing IP addresses of client devices in a network.

Moreover, the IP address management may involve: receiving an IP request associated with a client device; determining, based on a MAC address of the client device, whether an IP address is already assigned to the client device or whether the assigned IP address has exceeded a lease time; if not, assigning a new IP address to the client device; and avoiding collisions in the network by reassigning a different IP address to another client device in the network. Furthermore, determining whether the IP address is already assigned to the client device or whether the assigned IP address has exceeded the lease time may involve a look-up operation using a hash table. The processing of a sequence of packets associated with the DHCP data flow to a particular destination may be accelerated by storing a result of the look-up operation performed for a first packet in the sequence, so that subsequent packets in the sequence use the stored result without performing the look-up operation.

In addition, because virtual dataplane 500 interacts with and has access to information (such as statistical information) about network activity of client devices in a network (such as a WLAN), virtual dataplane 500 may be able to perform client-device-centric management of the IP addresses. For example, the network activity may include user traffic pattern or usage of a client device, which may allow virtual dataplane 500 to intelligently manage the IP addresses. Consequently, virtual dataplane 500 may dynamically free up IP addresses in the network based on network activity of the client devices. This may allow a lot of un-intended or unused IP addresses to be recovered, which may resolve a significant IP address management challenge, and which may reduce the cost and simplify IP address management.

Moreover, virtual dataplane 500 may implement at least some functionality of or may be included in a controller in the network. This integration may facilitate fast and efficient processing of packets in virtual dataplane 500. Alternatively or additionally, virtual dataplane 500 may aggregate packets into an encryption flow, such as a virtual private network tunnel.

In some embodiments, the packets associated with other data flows that are identified by first path 514 are subsequently dropped in virtual dataplane 500. This operation may free up resources in virtual dataplane 500 so that the identified packets in the DHCP data flow can be processed efficiently.

Alternatively, an optional second path 516 in pipeline 510 may process the packets associated with the other data flows that are consumed external to virtual dataplane 500, where the processing in second path 516 occurs with a fixed time delay. Note that the processing of the packets associated with the other data flows in second path 516 may be faster than the processing of the packets associated with the DHCP data flow in first path 514. Furthermore, the processing in first path 514 and in second path 516 may occur concurrently (e.g., in parallel).

When a packet is received in first path 514 and/or optional second path 516, information associated with the packet may be used to look-up associated pre-calculated or predefined processing parameters for an associated data flow. Then, the packet is processed and/or modified, as needed, based on these pre-calculated processing parameters using first path 514 or second path 516 with a fixed number of instructions. In order to achieve a fixed number of instructions in processing a packet, a flow module or engine may be used. This flow module may build the pre-calculated processing parameters under complicated or less-complicated configurations, or with a table size, in the background, such that, when a subsequent packet in the same data flow arrives, it does not have to go through the same process again. Instead, using available and accurate information, the packet may be processed and forwarded promptly. Moreover, multiple packets may be concurrently processed in this way using different cores in the processor in the electronic device. Consequently, the second path 516 may offer high-performance with predictability, such as a fixed packet latency (i.e., the time span of a packet entering the electronic device and then leaving the electronic device) regardless of the traffic utilization in the network.

Note that the pre-calculated processing parameters in a look-up table may be calculated at the start of a data flow and/or after a time interval has elapsed (such as 1, 2, 5 or 10 s) since a previous instance of calculating the processing parameters. Because the look-up table with the pre-calculated processing parameters eliminates the need for calculating the processing parameters as packets are received (which, in general, can take a variable amount of time), virtual dataplane 500 can provide deterministic performance (such as high data rates and/or a fixed and minimum-delayed packet latency). Thus, virtual dataplane 500 may be substantially more than a software implementation of hardware.

Furthermore, the electronic device may include a hardware and/or a software implementation of the DHCP-server and/or NAT functionality for the client devices. Moreover, the electronic device may be accessible via a network, such as the Internet and/or an intranet. Furthermore, a variety of processors may be used to execute a dataplane module that provides the virtual machine(s) in the dataplane. In some embodiments, the software architecture of dataplane 500 is independent of the multi-core processor that is used. For example, a Cavium multi-core processor (from Cavium, Inc. of San Jose, Calif.) or an Intel multi-core processor (from Intel, Inc. of Santa Clara, Calif.) may be used. Additionally, a given access point may communicate with the electronic device using wired communication protocol (such as IEEE 802.3, which is sometimes referred to as 'Ethernet,' such as an Ethernet II standard) and/or a wireless communication protocol (such as IEEE 802.11, which is sometimes referred to as 'Wi-Fi' from the Wi-Fi Alliance of Austin, Tex.). However, a wide variety of communication techniques or protocols may be used.

In an exemplary embodiment, the virtual dataplane provides high-performance DHCP transactions, e.g., more than 20,000 user IP address assignments per second, which may be 200× faster than a Linux socket-based DHCP server. By implementing the DHCP-server functionality in the virtual dataplane, the electronic device may reduce the need for an extra external appliance, which may help simplify the network topology and may reduce the cost of deployment. In addition, the IP address pool can be efficiently managed based upon the user traffic pattern or network activity instead of solely on the lease time.

In some embodiments, while one virtual dataplane is running with the DHCP-server functionality turned on, another virtual dataplane can be acting as a DHCP-server backup device and may receive on-the-fly checkpoint data from a primary node. The checkpoint data can be processed with high efficiency by taking advantage of the high-performance virtual dataplane throughput. Consequently, there may not be a need for an extra external device or appliance to be installed for DHCP-server redundancy support between the primary node and backup nodes.

Furthermore, the communication technique may provide quality-of-service (QoS) treatment and client-traffic isolation through DHCP profile configuration, which predefine preferences, priorities and/or sets of interrelated sources and recipients for different DHCP data flows. In addition, integrating the DHCP-server functionality with the virtual dataplane may facilitate more precise management of DHCP IP addresses, which may be suitable for Wi-Fi application in public venues.

We now further describe an exemplary embodiment of DHCP-server functionality that may be implemented using the virtual dataplane. The virtual dataplane may achieve high-throughput processing of DHCP-server functionality by bypassing traditional DHCP-packet processing via a Linux-socket interface. A traditional DHCP server module often sits on top of the Linux socket and waits for DHCP packets to arrive. Thus, these packets usually have to go through a Linux kernel, a socket interface, memory copy, etc., before the ultimate service module can receive the packets.

The virtual dataplane may hijack the DHCP packets right out of the metal packet driver, and may send these identified DHCP packets directly to DHCP server module residing in the virtual dataplane packet engine. In particular, the virtual dataplane may bypass a Linux kernel and a socket interface, and may perform zero memory copy to receive the DHCP packets first hand coming from a physical interface. Moreover, the DHCP server profiles may be pre-populated into an array that is in ascending order for faster binary search at packet reception.

The same approach may be used for sending DHCP reply packets, such as offer, ACK, or NAK. The reply packet may go straight to the metal packet driver, and thus may bypass the socket interface, internal packet memory copy, Linux kernel, etc., to achieve high throughput.

Furthermore, the same approach may be used for a subsequent ARP request after the client device (or user equipment) receives the DHCP offer. In particular, because the virtual dataplane is the DHCP server and will be answering the ARP, the same mechanism may be used to process an ingress ARP request and to forward the packet directly to the virtual dataplane packet engine. Thus, the virtual dataplane may generate the ARP reply almost immediately.

Based upon testing with 20,000 client devices requesting IP addresses, if the virtual dataplane is set up as the designated DHCP server, the performance is more than 200× faster than if the DHCP server is implemented through another Linux-based external module.

Note that the virtual dataplane may take into account if the assigned client-device IP address lease time is expired, and may come back and ask for another IP address through DHCP exchanges. In this case, the same existing IP address will be selected for this client device unless the virtual dataplane DHCP server ran out of IP addresses in the IP pool. The selection and the use of the previously used IP address may also be immediate because the assigned IP address may be managed through two different hash tables, e.g., a client-device MAC-based key hash table and an assigned IP-based key hash table. Because the IP address may be readily available or rapidly determined via one or more hash tables, there may be no need to spend time digging into the IP pool resource table for the intended IP address.

The DHCP server module can be enabled through the following processes. At bootup of the virtual dataplane, the virtual dataplane may provide a parameter in 'cli_opt.txt' or a command line such as as 'dhcp_server <enable|disable>.' Then, the virtual dataplane may issue a 'dhcps_service <enable|disable>.' Moreover, the virtual dataplane may check if a 'dhcpd.conf' file exists to decide if the DHCP server module can populate the specified profiles into internal memory (such as DRAM).

Moreover, the DHCP server module can provide IP address assignments for the following DHCP categories: DHCP-request type packets coming from access-point tunnels (in 68->67 User Datagram Protocol port format); DHCP-request type packets coming from access-point tunnels that was relayed locally to local a DHCP server (in 67->67 User Datagram Protocol port format); DHCP-request type packets coming from another virtual dataplane device (in 67->67 User Datagram Protocol port format), where these packets may come with option-82/sub-option 3 insertion; DHCP-request type packets coming from another gateway such as a router, etc. (in 67->67 User Datagram Protocol port format), where these packets may not come with proprietary option-82/sub-option 3 insertion; and/or DHCP-request type packets coming from core side raw IP/User Datagram Protocol packet types (in 68->67 User Datagram Protocol port format), where these packets may be broadcast types during DHCP discover or may be destined for the virtual dataplane in a DHCP request or another request.

As shown in Table 1, in the 'dhcpd.conf' file note that multiple profiles can be specified. These may be same as those used in the common Linux-based DHCP server setup, except the last three lines in this example.

TABLE 1

| ##---- DHCP server profile example ---- |
| --- |
| subnet 10.92.0.0 netmask 255.255.0.0<br>{<br>range 10.92.0.100 10.92.6.200;<br>option broadcast-address 10.92.255.255;<br>option domain-name-servers 172.16.200.5;<br>option routers 10.92.0.1;<br>default-lease-time 300;<br>option domain-name profile__vlan__A<br>range-vlan 100 200;<br>option ue-to-ue<br>option link profile__vlan__B<br>} |

For default condition, the virtual dataplane may maintain one IP range with a subnet mask. The domain name and domain name server (DNS address) may be stored as part of the configuration. Moreover, each IP address may be stored individually as a managed resource. Thus, the stored information may include: an IP range, an IP subnet mask, a domain name, a domain name server, and/or other information.

Moreover, as noted previously, the virtual dataplane may use two hash tables to track the activity of assigned IP addresses for client devices or user equipment (UEs). One hash table may be keyed by an assigned IP address and the client device virtual local area network (vlan), and the other hash table may be keyed by the MAC address of the client device. Table 2 illustrates the IP hash table, and Table 3 illustrates the MAC hash table. The assigned IP hash table may be maintained by the activity of DHCP discover and release messages. Furthermore, the client-device MAC hash table may be controlled by the network activities of the client device. Note that the two hash tables may not be synchronized with each other. For example, when a client device sends a DHCP release to give away its IP assignment, the client-device MAC entry may still be maintained in the MAC hash table for future reference.

TABLE 2

| Index | IP Address | vlan |
|---|---|---|
| Index 1 | IP Address A | vlan C |
| Index 2 | IP Address B | vlan D |

TABLE 3

| Index | MAC |
|---|---|
| Index 1 | MAC A |
| Index 2 | MAC B |

Figure 6:
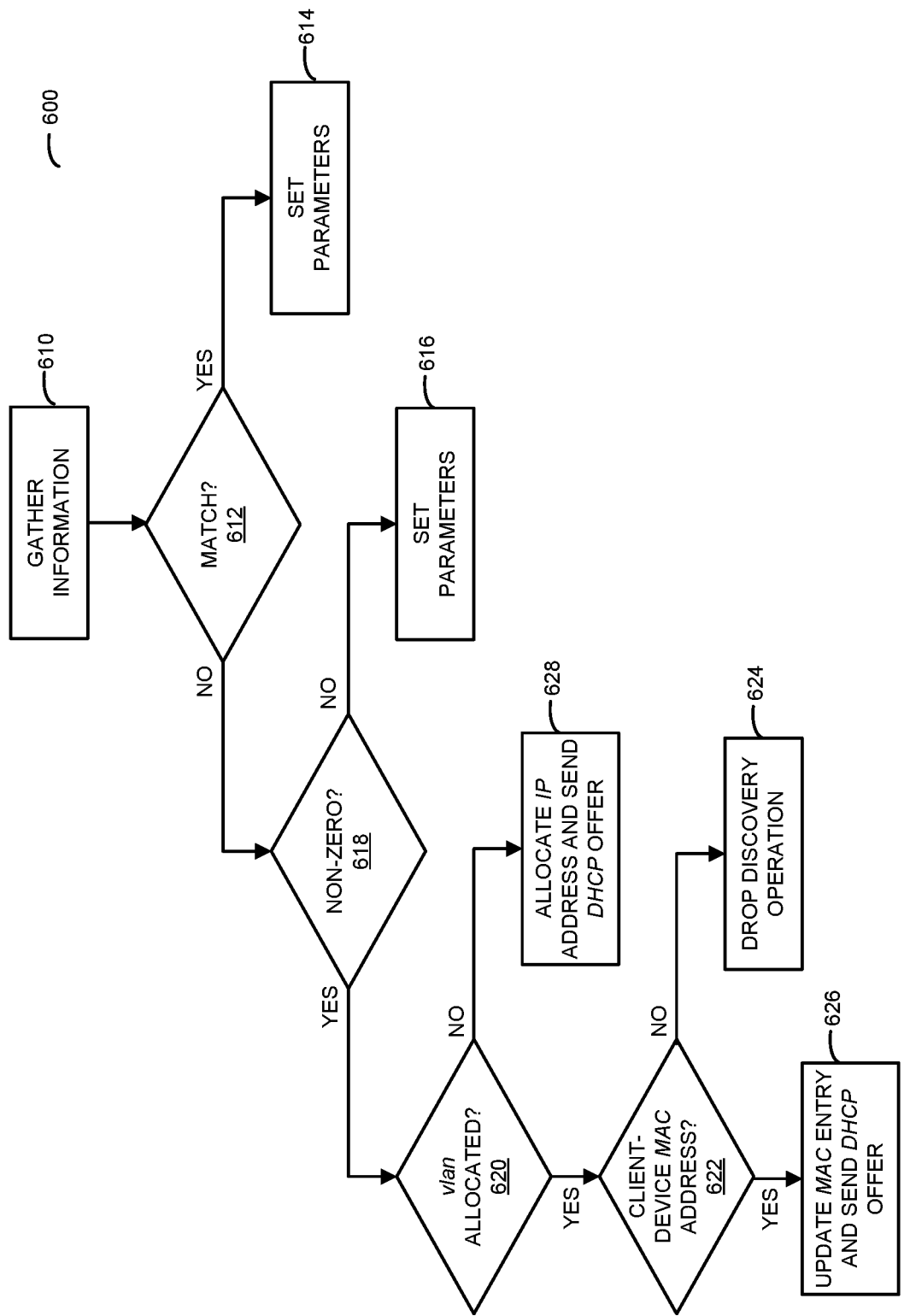
FIG. 6 is a flow diagram illustrating a method for performing Dynamic Host Control Protocol (DHCP) discovery handling in accordance with an embodiment of the present disclosure.

FIG. 6 presents a method 600 for performing DHCP discovery handling. During the DHCP discovery handling, the virtual dataplane may gather information (operation 610). For example, the information may include: the client-device MAC address (option 61), the requested IP address (option 50), and/or the client-device-side vlan. Then, the virtual dataplane may access the current MAC hash table look for a match (operation 612) with the client-device MAC address. If a match is found (operation 612) in the MAC hash table, the virtual dataplane may set parameters (operation 614), including: the requested IP address to, e.g., 0.0.0.0 to send a DHCP offer back using the assigned IP address (which makes sure the IP hash table can be plugged in, and otherwise uses the next available IP address); the assigned IP address to the non-zero requested IP address to send a DHCP offer back using the same IP address (which makes sure the IP hash table can be plugged in, and otherwise silently drops the packet); and/or the assigned IP not equal to the non-zero requested IP address to silently drop the discover (i.e., no NAK back). Note that numerical values in this discussion of the embodiments are for purposes of illustration only. In other embodiments, different numerical values may be used.

Moreover, if a match is not found (operation 612) in the MAC hash table, the virtual dataplane may set parameters (operation 616). For example, if the requested IP address is set to, e.g., 0.0.0.0, the virtual dataplane may allocate the next available IP address from the free IP pool, and may send a DHCP offer back with this IP address. Additionally, if the virtual dataplane is running out of IP addresses in the IP pool, the virtual dataplane may silently drop the discover (i.e., no NAK back).

Finally, if a match is not found (operation 612) in the MAC hash table, and the requested IP address is non-zero (operation 618), the virtual dataplane may check that the requested IP/client-device vlan is allocated (operation 620) in the IP hash table. If an existing entry is found (operation 620), and the MAC address is not the client-device MAC address (operation 622), the virtual dataplane may silently drop the discover (operation 624) (i.e., no NAK back). However, if the MAC address is the client-device MAC address (operation 622), the virtual dataplane may update the MAC entry (operation 626), and may send a DHCP offer back (operation 626). Alternatively, if it is not an existing entry (operation 620), then the virtual dataplane may poke into the free IP pool to get this IP address allocated, and may send a DHCP offer back (operation 628).

Figure 7:
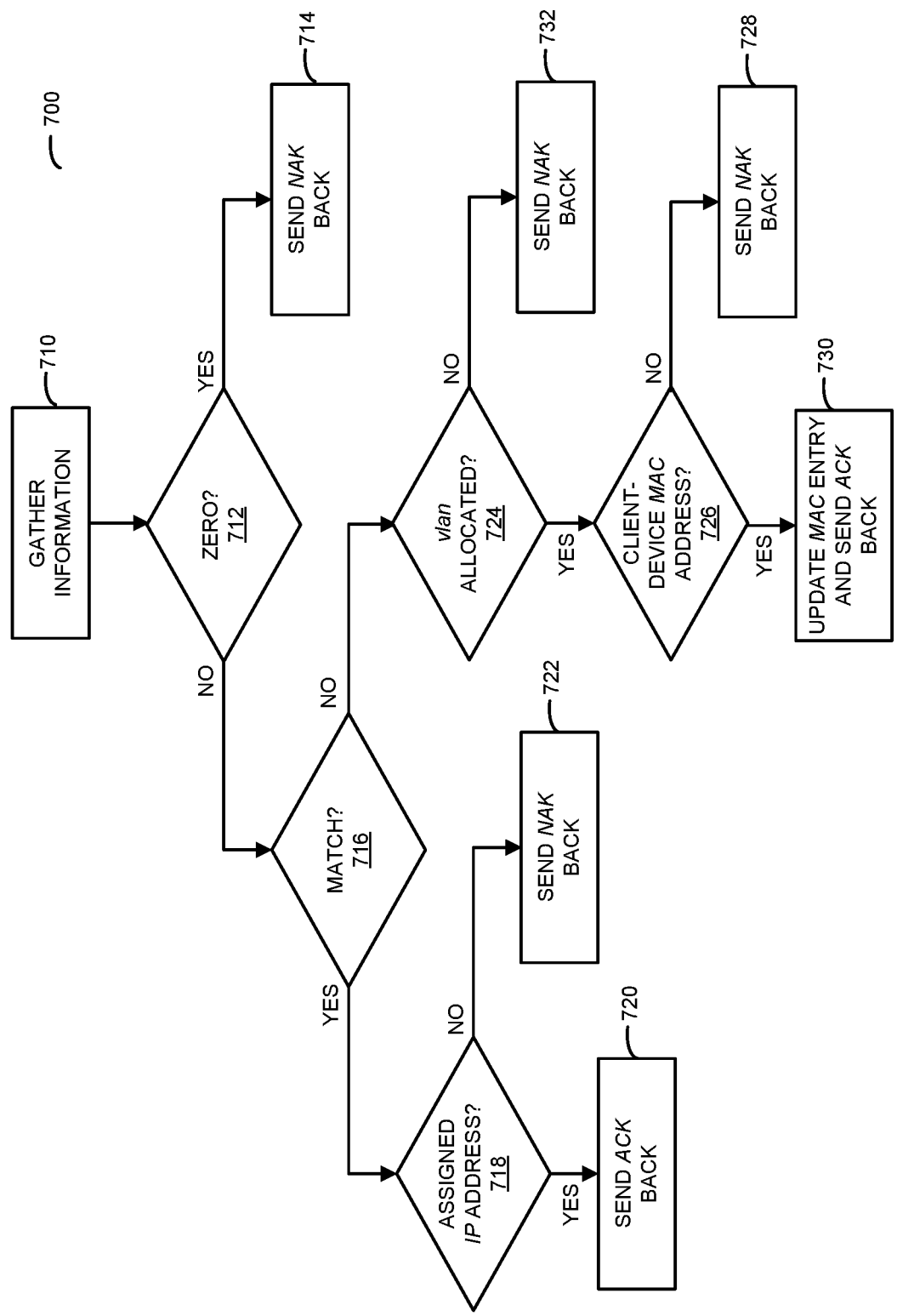
FIG. 7 is a flow diagram illustrating a method for performing DHCP request handling in accordance with an embodiment of the present disclosure.

FIG. 7 presents a method 700 for performing DHCP request handling. During the DHCP request handling, the virtual dataplane may gather information (operation 710). For example, the information may include: the client-device MAC address (option 61), the requested IP address (option 50), and/or the client-device-side vlan. If the requested IP address is, e.g., 0.0.0.0 (operation 712), the virtual dataplane may send NAK back (operation 714).

Then, the virtual dataplane may access the current MAC hash table look for a match (operation 716) with the client-device MAC address. Moreover, if a match is found (operation 716) in the MAC hash table, the virtual dataplane may check (operation 718) if the assigned IP address is the same as the non-zero requested IP address. In particular, if the assigned IP address equals the non-zero requested IP address, the virtual dataplane may send ACK back using the same IP address (operation 720). Otherwise, if the assigned IP address is not equal to the non-zero requested IP address, the virtual dataplane may send NAK back (operation 722).

Furthermore, if a match not found (operation 716) in the MAC hashed table (the requested IP address is non-zero), the virtual dataplane may check the requested IP/client-device vlan is allocated in the IP hash table (operation 724). If an existing entry found (operation 724), and the MAC address is not the client-device MAC address (operation 726), the virtual dataplane may send NAK back (operation 728). However, if the MAC address is the client-device MAC address (operation 726), the virtual dataplane may update the MAC entry (operation 730), and may send ACK back (operation 730). Finally, if it is not an existing entry (operation 724), the virtual dataplane may send NAK back (operation 732).

Figure 8:
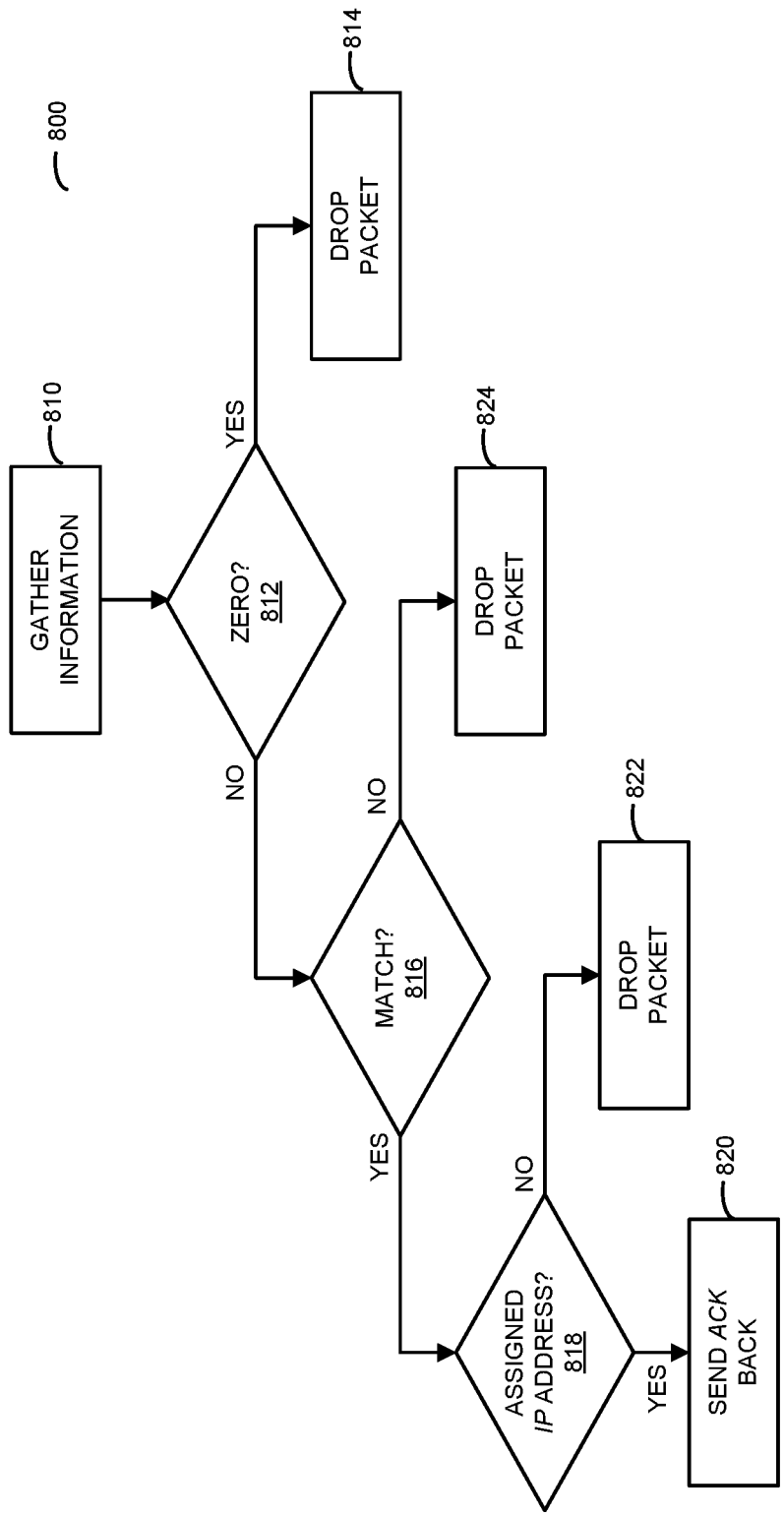
FIG. 8 is a flow diagram illustrating a method for performing DHCP inform handling in accordance with an embodiment of the present disclosure.

FIG. 8 presents a method 800 for performing DHCP inform handling. During the DHCP inform handling, the virtual dataplane may gather information (operation 810). For example, the information may include: the client-device MAC address (option 61), the client-device (non-zero) IP address, and/or the client-device-side vlan. If the client IP address is, e.g., 0.0.0.0 (operation 812), the virtual dataplane may silently drop the packet (operation 814).

Then, the virtual dataplane may access the current MAC hash table look for a match (operation 816) with the client-device MAC address. If a match is found (operation 816) in the MAC hash table, the virtual dataplane may check if the assigned IP address is the same as non-zero client-device IP address (operation 818). In particular, if the assigned IP address equals the non-zero client IP address (operation 818), the virtual dataplane may send ACK back using the same IP address (operation 820), and if the assigned IP address is not equal to the non-zero client IP address (operation 818) the virtual dataplane may silently drop the packet (operation 822). Furthermore, if a match is not found (operation 816) in the MAC hashed table (and the client-device IP address is non-zero), the virtual dataplane may silently drop the packet (operation 824).

Figure 9:
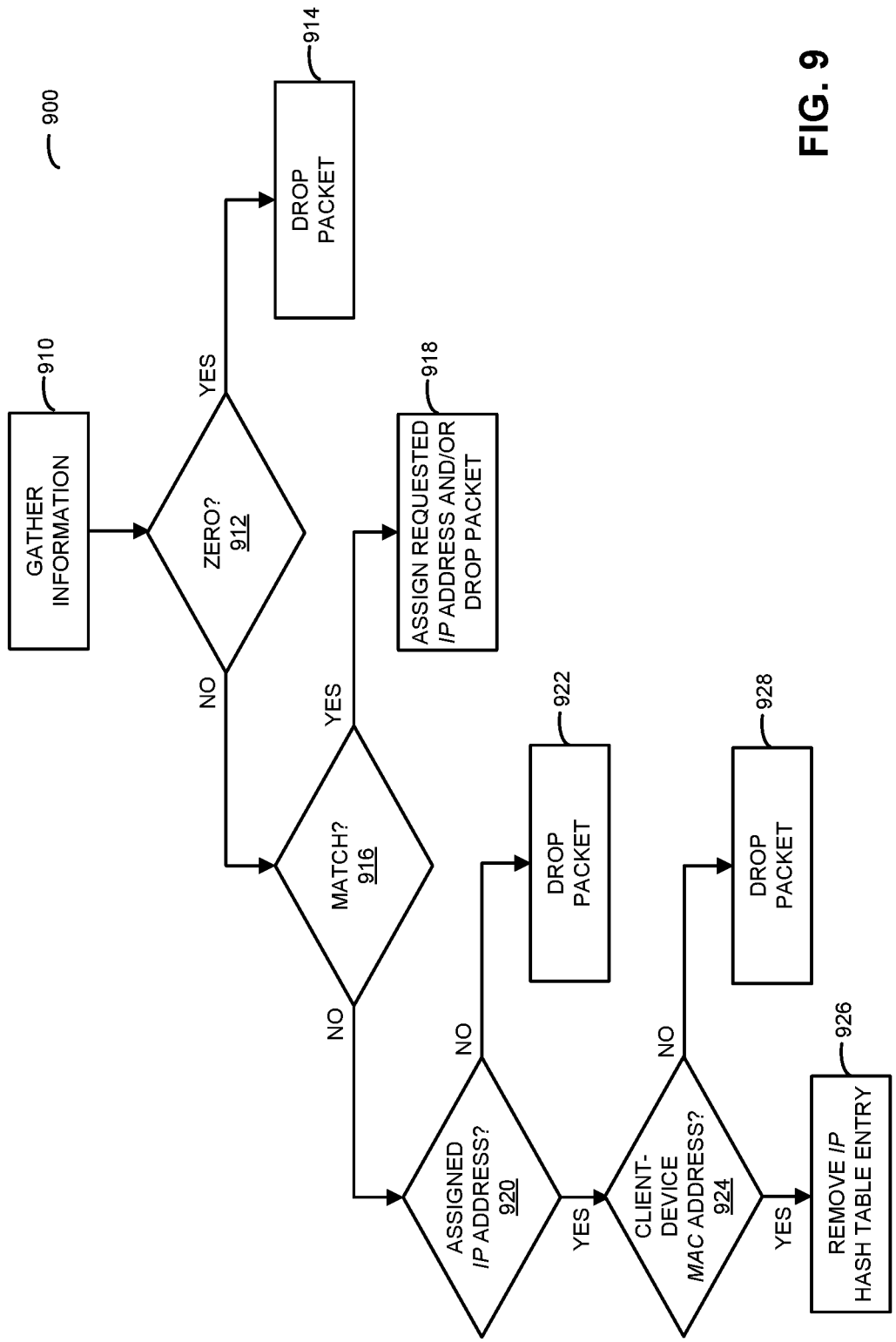
FIG. 9 is a flow diagram illustrating a method for performing DHCP release handling in accordance with an embodiment of the present disclosure.

FIG. 9 presents a method 900 for performing DHCP release handling. During the DHCP release handling, the virtual dataplane may gather information (operation 910). For example, the information may include: the client-device MAC address (option 61), the requested non-zero IP address (option 50), and/or the client-device-side vlan. There may be no reply packet sent back to client device, i.e., the packet may be silently dropped. In particular, if the requested IP address is, e.g., 0.0.0.0 (operation 912), the virtual dataplane may silently drop the packet (operation 914).

Then, the virtual dataplane may access the current MAC hash table look for a match (operation 916) with the client-device MAC address. If a match found (operation 916) in the MAC hash table, the virtual dataplane may assigned the IP address equal to the non-zero requested IP address (operation 918) to remove the IP hash table entry (while keeping the MAC hash table entry), and/or the assigned IP address not equal to the non-zero requested IP address to do nothing, i.e., the packet is silently dropped (operation 918).

Moreover, if a match is not found (operation 916) in the MAC hash table (and the requested IP address is non-zero), the virtual dataplane may check that the requested IP/client-device vlan is allocated in the IP hash table (operation 920). If not (operation 920), the packet may be silently dropped (operation 922). However, if an existing entry is found (operation 920), and the MAC address is the client-device MAC address (operation 924), the virtual dataplane may remove the IP hash table entry (operation 926). Alternatively, if it is not an existing entry (operation 924), the virtual dataplane may do nothing, i.e., the packet is silently dropped (operation 928).

Figure 10:
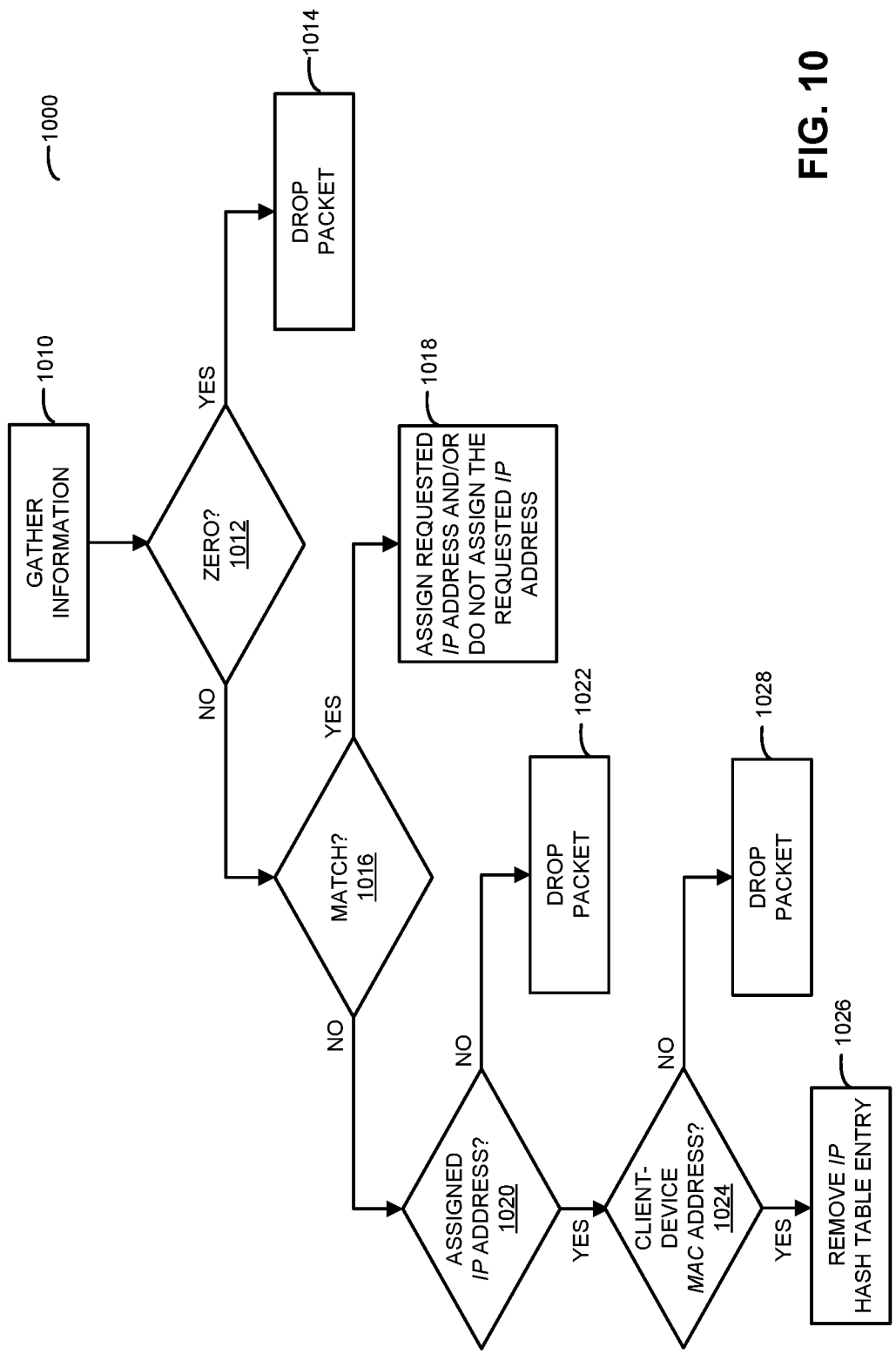
FIG. 10 is a flow diagram illustrating a method for performing DHCP decline handling in accordance with an embodiment of the present disclosure.

FIG. 10 presents a method 1000 for performing DHCP decline handling. During the DHCP decline handling, the virtual dataplane may gather information (operation 1010). For example, the information may include: the client-device MAC address (option 61), the requested non-zero IP address (option 50), and/or the client-device-side vlan. There may be no reply packet sent back to client device, i.e., the packet may be silently dropped. In particular, if the requested IP address is, e.g., 0.0.0.0 (operation 1012), the virtual dataplane may silently drop the packet (operation 1014).

Then, the virtual dataplane may access the current MAC hash table look for a match (operation 1016) with the client-device MAC address. If a match found (operation 1016) in the MAC hash table, the virtual dataplane may assigned the IP address equal to the non-zero requested IP address (operation 1018) to remove the IP hash table entry and to remove the MAC hash table entry, and/or the assigned IP address not equal to the non-zero requested IP address (operation 1018) to only remove the MAC hash table entry.

Moreover, if a match is not found (operation 1016) in the MAC hash table (and the requested IP address is non-zero), the virtual dataplane may check that the requested IP/client-device vlan is allocated in the IP hash table (operation 1020). If not (operation 1020), the packet may be silently dropped (operation 1022). However, if an existing entry is found (operation 1020), and the MAC address is the client-device MAC address (operation 1024), the virtual dataplane may remove the IP hash table entry (operation 1026). Alternatively, if it is not an existing entry (operation 1024), the virtual dataplane may do nothing, i.e., the packet may be silently dropped (operation 1026).

We now describe embodiments of an electronic device, which may perform at least some of the operations in the communication technique. For example, the electronic device may include or may implement a virtual dataplane that performs the operations in FIG. 1 or an access point (which may perform counterparts to the operations in FIG. 2). FIG. 11 presents a block diagram illustrating an electronic device 1100 in accordance with some embodiments. This electronic device includes processing subsystem 1110, memory subsystem 1112, and networking subsystem 1114. Processing subsystem 1110 includes one or more devices configured to perform computational operations. For example, processing subsystem 1110 can include one or more microprocessors, ASICs, microcontrollers, programmable-logic devices, and/or one or more digital signal processors (DSPs).

Memory subsystem 1112 includes one or more devices for storing data and/or instructions for processing subsystem 1110 and networking subsystem 1114. For example, memory subsystem 1112 can include dynamic random access memory (DRAM), static random access memory (SRAM), and/or other types of memory. In some embodiments, instructions for processing subsystem 1110 in memory subsystem 1112 include: one or more program modules or sets of instructions (such as program module 1122 or operating system 1124), which may be executed by processing subsystem 1110. Note that the one or more computer programs may constitute a computer-program mechanism. Moreover, instructions in the various modules in memory subsystem 1112 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1110.

In addition, memory subsystem 1112 can include mechanisms for controlling access to the memory. In some embodiments, memory subsystem 1112 includes a memory hierarchy that comprises one or more caches coupled to a memory in electronic device 1100. In some of these embodiments, one or more of the caches is located in processing subsystem 1110.

In some embodiments, memory subsystem 1112 is coupled to one or more high-capacity mass-storage devices (not shown). For example, memory subsystem 1112 can be coupled to a magnetic or optical drive, a solid-state drive, or another type of mass-storage device. In these embodiments, memory subsystem 1112 can be used by electronic device 1100 as fast-access storage for often-used data, while the mass-storage device is used to store less frequently used data.

Networking subsystem 1114 includes one or more devices configured to couple to and communicate on a wired and/or wireless network (i.e., to perform network operations), including: control logic 1116, an interface circuit 1118 and one or more antennas 1120 (or antenna elements). (While FIG. 11 includes one or more antennas 1120, in some embodiments electronic device 1100 includes one or more nodes, such as nodes 1108, e.g., a pad, which can be coupled to the one or more antennas 1120. Thus, electronic device 1100 may or may not include the one or more antennas 1120.) For example, networking subsystem 1114 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, a transmit antenna radiation pattern of electronic device 1100 may be adapted or changed using pattern shapers (such as reflectors) in one or more antennas 1120 (or antenna elements), which can be independently and selectively electrically coupled to ground to steer the transmit antenna radiation pattern in different directions. Thus, if one or more antennas 1120 includes N antenna-radiation-pattern shapers, the one or more antennas 1120 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 1114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1100 may use the mechanisms in networking subsystem 1114 for performing simple wireless communication between the electronic devices, e.g., transmitting advertising or beacon frames and/or scanning for advertising frames transmitted by other electronic devices as described previously.

Within electronic device 1100, processing subsystem 1110, memory subsystem 1112, and networking subsystem 1114 are coupled together using bus 1128. Bus 1128 may include an electrical, optical, and/or electro-optical connection that the subsystems can use to communicate commands and data among one another. Although only one bus 1128 is shown for clarity, different embodiments can include a different number or configuration of electrical, optical, and/or electro-optical connections among the subsystems.

In some embodiments, electronic device 1100 includes a display subsystem 1126 for displaying information on a display, which may include a display driver and the display, such as a liquid-crystal display, a multi-touch touchscreen, etc.

Electronic device 1100 can be (or can be included in) any electronic device with at least one network interface. For example, electronic device 1100 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a controller, a router, a switch, communication equipment, an access point, test equipment, and/or another electronic device.

Although specific components are used to describe electronic device 1100, in alternative embodiments, different components and/or subsystems may be present in electronic device 1100. For example, electronic device 1100 may include one or more additional processing subsystems, memory subsystems, networking subsystems, and/or display subsystems. Additionally, one or more of the subsystems may not be present in electronic device 1100. Moreover, in some embodiments, electronic device 1100 may include one or more additional subsystems that are not shown in FIG. 11. Also, although separate subsystems are shown in FIG. 11, in some embodiments some or all of a given subsystem or component can be integrated into one or more of the other subsystems or component(s) in electronic device 1100. For example, in some embodiments program module 1122 is included in operating system 1124 and/or control logic 1116 is included in interface circuit 1118.

Moreover, the circuits and components in electronic device 1100 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1114. The integrated circuit may include hardware and/or software mechanisms that are used for transmitting wireless signals from electronic device 1100 and receiving signals at electronic device 1100 from other electronic devices. Aside from the mechanisms herein described, radios are generally known in the art and hence are not described in detail. In general, networking subsystem 1114 and/or the integrated circuit can include any number of radios. Note that the radios in multiple-radio embodiments function in a similar way to the described single-radio embodiments.

In some embodiments, networking subsystem 1114 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as an illustrative example, in other embodiments a wide variety of communication protocols and, more generally, communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 1122, operating system 1124 (such as a driver for interface circuit 1118) or in firmware in interface circuit 1118. Alternatively or additionally, at least some of the operations in the communication technique may be implemented in a physical layer, such as hardware in interface circuit 1118.

Moreover, while the preceding discussion illustrated the communication technique using a dataplane associated with an electronic device that implements DHCP-server and/or NAT functionality, more generally the communication technique (and, in particular, the dataplane module) may be used with an arbitrary electronic device having or implementing arbitrary functionality. Furthermore, the approach of pre-calculating processing parameters so that a software module can obtain predictable performance may be applied to an arbitrary type of software (and thus is not limited to communications or a software implementation of an ASIC or an FPGA).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device that implements a virtual dataplane using one or more virtual machines, wherein a given virtual machine comprises an operating system or an application environment that is configured, using software, to emulate dedicated dataplane hardware or functionality of the dedicated dataplane hardware, comprising:
   an interface circuit that is configured to communicate with one or more access points;
   a memory that is configured to store program instructions; and
   a processor, coupled to the interface circuit and the memory, that is configured to execute the program instructions, wherein, when executed by the processor, the program instructions cause the electronic device to provide a pipeline in the virtual dataplane, wherein the pipeline comprises:
      a first stage that is configured to parse packets to identify packets associated with data flows, wherein the identification is based on types of packets comprising packets associated with a Dynamic Host Control Protocol (DHCP) data flow; and
      a first path that is configured to process the packets associated with the DHCP data flow that are consumed in the virtual dataplane, wherein the processing comprises Internet Protocol (IP) address management by one or more applications executed by the processor and accessed via the first path,
      wherein the IP address management comprises assigning IP addresses and avoiding collisions with existing IP addresses of client devices in a network, and
      wherein the virtual dataplane processes the packets associated with the DHCP data flow without using an operating-system kernel to access a DHCP server.

2. The electronic device of claim 1, wherein the pipeline further comprises a second path that processes the packets associated with other data flows that are consumed external to the virtual dataplane; and
   wherein the processing in the second path occurs with a fixed time delay.

3. The electronic device of claim 2, wherein the processing of the packets associated with the other data flows in the second path is faster than the processing of the packets associated with the DHCP data flow in the first path.

4. The electronic device of claim 2, wherein the processing in the first path and in the second path occur concurrently.

5. The electronic device of claim 1, wherein the packets associated with other data flows that are identified by the first stage are subsequently dropped in the virtual dataplane.

6. The electronic device of claim 1, wherein the IP address management comprises dynamically freeing up IP addresses in the network based on network activity of the client devices.

7. The electronic device of claim 1, wherein the IP address management comprises: receiving an IP request associated with a client device; determining, based on a media access control (MAC) address of the client device, whether an IP address is already assigned to the client device or whether the assigned IP address has exceeded a lease time; if not, assigning a new IP address to the client device; and avoiding collisions in the network by reassigning a different IP address to another client device in the network.

8. The electronic device of claim 7, wherein determining whether the IP address is already assigned to the client device or whether the assigned IP address has exceeded the lease time comprises a look-up operation using a hash table.

9. The electronic device of claim 8, wherein processing of a sequence of packets associated with the DHCP data flow to a particular destination is accelerated by storing a result of the look-up operation performed for a first packet in the sequence so that subsequent packets in the sequence use the stored result without performing the look-up operation.

10. The electronic device of claim 1, wherein the one or more applications perform Network Address Translation (NAT).

11. A non-transitory computer-readable storage medium for use in conjunction with an electronic device that implements a virtual dataplane using one or more virtual machines, wherein a given virtual machine comprises an operating system or an application environment that uses software to emulate dedicated dataplane hardware or functionality of the dedicated dataplane hardware, the computer-readable storage medium storing program instructions, wherein, when executed by the electronic device, the program instructions cause the electronic device to process packets in the virtual dataplane by performing operations comprising:

providing a pipeline in the virtual dataplane, wherein providing the pipeline comprises:

parsing, in a first stage, the packets to identify packets associated with data flows, wherein the identification is based on types of packets comprising packets associated with a Dynamic Host Control Protocol (DHCP) data flow; and processing, in a first path, the packets associated with the DHCP data flow that are consumed in the virtual dataplane, wherein the processing comprises Internet Protocol (IP) address management by one or more applications executed by a processor in the electronic device and accessed via the first path, wherein the IP address management comprises assigning IP addresses and avoiding collisions with existing IP addresses of client devices in a network, and wherein the virtual dataplane processes the packets associated with the DHCP data flow without using an operating-system kernel to access a DHCP server.

12. The computer-program product of claim 11, wherein the operations further comprise processing, in a second path, the packets associated with other data flows that are consumed external to the virtual dataplane; and wherein the processing in the second path occurs with a fixed time delay.

13. The computer-program product of claim 11, wherein the packets associated with other data flows that are identified by the first stage are subsequently dropped in the virtual dataplane.

14. The computer-program product of claim 11, wherein the IP address management comprises dynamically freeing up IP addresses in the network based on network activity of the client devices.

15. The computer-program product of claim 11, wherein the IP address management comprises: receiving an IP request associated with a client device;

determining, based on a media access control (MAC) address of the client device, whether an IP address is already assigned to the client device or whether the assigned IP address has exceeded a lease time; if not, assigning a new IP address to the client device; and avoiding collisions in the network by reassigning a different IP address to another client device in the network.

16. The computer-program product of claim 15, wherein determining whether the IP address is already assigned to the client device or whether the assigned IP address has exceeded the lease time comprises a look-up operation using a hash table.

17. The computer-program product of claim 16, wherein processing of a sequence of packets associated with the DHCP data flow to a particular destination is accelerated by storing a result of the look-up operation performed for a first packet in the sequence so that subsequent packets in the sequence use the stored result without performing the look-up operation.

18. A method for processing packets in an electronic device that implements a virtual dataplane using one or more virtual machines, wherein a given virtual machine comprises an operating system or an application environment that is configured, using software, to emulate dedicated dataplane hardware or functionality of the dedicated dataplane hardware, the method comprising:

parsing, in a first stage in a pipeline in the virtual dataplane, packets to identify packets associated with data flows, wherein the identification is based on types of packets comprising packets associated with a Dynamic Host Control Protocol (DHCP) data flow; and processing, in a first path in a pipeline in the virtual dataplane, the packets associated with the DHCP data flow that are consumed in the virtual dataplane, wherein the processing comprises Internet Protocol (IP) address management by one or more applications executed by a processor in the electronic device and accessed via the first path, wherein the IP address management comprises assigning IP addresses and avoiding collisions with existing IP addresses of client devices in a network, and wherein the virtual dataplane processes the packets associated with the DHCP data flow without using an operating-system kernel to access a DHCP server.

19. The method of claim 18, wherein the pipeline further comprises a second path that processes the packets associated with other data flows that are consumed external to the virtual dataplane; and wherein the processing in the second path occurs with a fixed time delay.

20. The method of claim 18, wherein the IP address management comprises dynamically freeing up IP addresses in the network based on network activity of the client devices.

* * * * *